(12) United States Patent
Panetta et al.

(10) Patent No.: US 9,299,130 B2
(45) Date of Patent: Mar. 29, 2016

(54) METHODS AND APPARATUS FOR IMAGE PROCESSING AND ANALYSIS

(71) Applicants: Karen A. Panetta, Rockport, MA (US); Shahan Nercessian, Arlington, MA (US); Sos Agaian, San Antonio, TX (US)

(72) Inventors: Karen A. Panetta, Rockport, MA (US); Shahan Nercessian, Arlington, MA (US); Sos Agaian, San Antonio, TX (US)

(73) Assignee: TRUSTEES OF TUFTS COLLEGE, Medford, MA (US)

(*) Notice: Subject to any disclaimer, the term of this patent is extended or adjusted under 35 U.S.C. 154(b) by 65 days.

(21) Appl. No.: 14/211,564

(22) Filed: Mar. 14, 2014

(65) Prior Publication Data

US 2014/0341481 A1    Nov. 20, 2014

Related U.S. Application Data

(60) Provisional application No. 61/792,365, filed on Mar. 15, 2013.

(51) Int. Cl.
- *G06K 9/40* (2006.01)
- *G06T 5/00* (2006.01)
- *G06T 5/50* (2006.01)

(52) U.S. Cl.
CPC .................. *G06T 5/002* (2013.01); *G06T 5/009* (2013.01); *G06T 5/50* (2013.01); *G06T 2207/10024* (2013.01); *G06T 2207/20016* (2013.01); *G06T 2207/20021* (2013.01); *G06T 2207/20182* (2013.01); *G06T 2207/20221* (2013.01)

(58) Field of Classification Search
CPC ......... G06T 5/001; G06T 5/002; G06T 5/009; G06T 5/20; G06T 5/40; G06T 5/50; G06T 11/60; H04N 5/20
See application file for complete search history.

(56) References Cited

U.S. PATENT DOCUMENTS

| | | | |
|---|---|---|---|
| 5,218,649 A | 6/1993 | Kundu et al. | |
| 5,300,169 A | 4/1994 | Tahara | |
| 5,325,449 A * | 6/1994 | Burt | G06T 5/50 348/E7.086 |
| 5,488,674 A * | 1/1996 | Burt | G06T 5/50 345/639 |
| 5,681,112 A | 10/1997 | Kuroda et al. | |
| 6,064,775 A | 5/2000 | Suzuki et al. | |
| 6,462,768 B1 | 10/2002 | Oakley | |
| 6,584,235 B1 * | 6/2003 | Fossum | G06T 1/60 345/629 |
| 6,876,777 B2 | 4/2005 | Liu | |
| 6,982,764 B1 | 1/2006 | Heath | |
| 7,620,265 B1 * | 11/2009 | Wolff | G06T 5/50 382/254 |
| RE41,447 E | 7/2010 | Tiana | |
| 7,840,066 B1 * | 11/2010 | Chen | G06T 5/002 382/168 |
| 8,331,711 B2 | 12/2012 | Gangwal et al. | |

(Continued)

OTHER PUBLICATIONS

Shahan C. Nercessian, Karen A. Panetta, Sos S. Agaian, Multiscale image fusion using an adaptive similarity-based sensor weighting scheme and human visual system-inspired contrast measure, Journal of Electronic Imaging, Apr.-Jun. 2012, vol. 21(2), pp. 021112-1-021112-13.

(Continued)

*Primary Examiner* — Amir Alavi
(74) *Attorney, Agent, or Firm* — Daly, Crowley, Mofford & Durkee, LLP

(57) ABSTRACT

Methods and apparatus to providing image fusion using a number of image processing approaches. In one embodiment, a single image is processed and image fusion is performed. In exemplary embodiments of the invention, image enhancement, denoising, edge detection, etc., can be provided.

5 Claims, 11 Drawing Sheets

(56) References Cited

U.S. PATENT DOCUMENTS

| | | | | |
|---|---|---|---|---|
| 8,411,938 | B2* | 4/2013 | Zhang | G06T 3/4061 |
| | | | | 348/453 |
| 9,053,558 | B2* | 6/2015 | Shen | G06T 5/50 |
| 2009/0245689 | A1* | 10/2009 | Panetta | G06T 5/40 |
| | | | | 382/284 |
| 2012/0275721 | A1 | 11/2012 | Lewis et al. | |
| 2014/0341481 | A1* | 11/2014 | Panetta | G06T 5/002 |
| | | | | 382/274 |
| 2015/0243041 | A1* | 8/2015 | Panetta | G06T 7/0081 |
| | | | | 382/164 |

OTHER PUBLICATIONS

Shahan C. Nercessian, Karen A. Panetta, Sos S. Agaian, A Multi-scale Non-local Means Algorithm for Image De-noising, Mobile Multimedia/Image Processing, Security, and Applications 2012, Proc. Of SPIE vol. 8406, pp. 84060J-1-84060J-10.

* cited by examiner

METHODS AND APPARATUS FOR IMAGE PROCESSING AND ANALYSIS

BACKGROUND

As is known in the art, a variety of techniques are known for enhancing images of scenes which are obscured by backscattered light. For example, there are many known methods for enhancing the contrast of images in such circumstances, but the maximum improvement in the quality of the image is limited by a number of factors, as disclosed in U.S. Pat. No. 6,462,768, which is incorporated herein by reference. For example, the gain of the camera or other sensing system is set, usually by an automatic gain control, to the maximum brightness of the image. When the scattered light component is large, the transmitted terrain component becomes small in comparison with the quantization noise of the sensor. In addition, the backscattered light often has a random component that is a source of noise which is amplified by any contrast-stretching transformation implemented by the sensor. Further, in low light conditions, statistical fluctuations in the transmitted photon flux give rise to noise in the image. This noise will be amplified by any transformation that increases the range of contrasts present in the image.

Various contrast enhancement algorithms are known, for example, variance normalization or histogram equalization, see, e.g., U.S. Pat. Nos. 6,462,768, 6,982,764, 8,331,711, 5,681,112, 5,218,649, 6,876,777, 5,300,169, and 6,064,775, and U.S. Patent Publications No. 2012/0275721, all of which are incorporated herein by reference. In practice, however, such known contrast enhancement algorithms have not provided particularly good results.

The aim of image enhancement is to modify input images in such a way that the visual content contained in the image is improved with respect to a set of defined criteria. As there is no single set of criteria which can universally define an ideal enhancement, many image enhancement techniques have been proposed. The most basic of image enhancement approaches include pixel transformations such as logarithmic transformations, gamma transformations, and contrast stretching operations, which define a fixed or parametrically adjustable one-to-one mapping by which the intensity values of individual pixels are modified. Histogram equalization is an automated enhancement process which uses the histogram of the input image itself to determine the one-to-one mapping of intensity values for which an approximately uniform distribution is yielded in the enhanced result. This procedure has been further generalized to histogram matching, whereby the input histogram is matched to any defined histogram distribution. As these methods use global image properties to determine pixel transformations and apply the same transformation to each pixel in the same way regardless of local image information, they may not be appropriately applied in a local context and often times yield inadequate detail preservation or over-enhancement. Consequently, adaptive procedures, such as contrast-limited adaptive histogram equalization, have been developed to locally adapt the enhancement process based on local image features. Moreover, algorithms such as multi-scale retinex attempt to model the transfer functions of the human optical nerve, cortex, and so forth, and formulate enhancement algorithms by implementing filters which recreate these processes to model human vision. However, the way in which these approaches actually enhance, and in particular, image edges, is still unpredictable. In this sense, the approaches may be classified as indirect image enhancement algorithms, as they enhance images and generally improve image contrast without explicitly defining image contrast itself. Conversely, direct image enhancement algorithms quantitatively define a contrast measure in either a spatial or transform domain, and achieve image enhancement by increasing the measured contrast. Accordingly, direct image enhancement algorithms have been developed using contrast measures defined in the DCT, pyramidal, and wavelet transform domains. These algorithms are capable of enhancing fine local edge structures, but generally are less successful in improving global image contrasts adequately even when scale parameters are chosen appropriately. Overall, it is still observed that no single image enhancement algorithm is capable of delivering an ideal enhancement for all circumstances and practical applications.

The goal of image denoising is to remove the noise which has corrupted an image. There may be many sources of the noise itself, including the imaging devices, particularly when image signals are weak, or a noisy transmission channel. Of particular interest is the problem of removing additive white Gaussian noise from images. The basic tradeoff which exists in denoising is between the ability to effectively remove noise while also accurately preserving edges. The most basic means of Gaussian noise denoising is Gaussian filtering. However, this approach is very prone to blurring edges and fine details as it filters isotropically. Partial differential equation (PDE) based approaches such as anisotropic diffusion generalize the replace of the isotropic filter with a conduction function which smoothes the image more in non-edge regions less on edges. Total variational approaches formulate the denoising problem as a constrained optimization problem. Wavelet-based denoising approaches have also been proposed based on several means of thresholding wavelet coefficients. Despite the formulations of algorithms, there will always inevitably be some tradeoff between sufficient noise removing and accurate edge preservation.

SUMMARY

Exemplary embodiments of the invention provide methods and apparatus for a fusion-based multimedia processing system and method that can solve real life multimedia related issues. Exemplary embodiments of the invention provide systems and methods utilizing image fusion to perform image processing by combining advantages of different image processing approaches. In general, embodiments of the invention improve over conventional approaches by the way in which image fusion, and the combination of multiple images, are integrated to improve existing image processing. Currently, image fusion has only been used when multiple source images from different capture techniques or imaging modalities are available. Multiple source images may not be available for many practical applications, and thus, there has been no means of utilizing image fusion in such cases. Exemplary embodiments of the invention provide systematically use image fusion when only a single image is available.

In embodiments, the system is also capable of processing and fusing multiple source images if they are available. The resulting system may be used for many different image applications, such as image enhancement, image denoising, edge detection, image resizing, image resolution, image encryption, image standardization/coloring, and others.

Exemplary embodiments of the invention illustrate possible uses of the system in the context of image enhancement and image denoising. As only a single image is used as input to image enhancement processing, the system in this context enhances the image using several different image enhancement processes, and fuses the results to obtain an enhanced result that leverages the benefits of each of the secondary enhancements.

In addition, since different image enhancement processes are based on different criteria, exemplary embodiments of the invention provide processing based upon the characteristics of the different enhancement approaches to effectively combine their advantages. In the context of image denoising, for example, it is generally expected that only a single image is available as input.

One embodiment provides iterative fusion-based denoising which fuses secondary denoising results with various degrees of smoothing. A small degree of smoothing is insufficient for removing noise in the image, but preserves the edges of the images. Conversely, a large degree of smoothing effectively removes noise but also blurs edges. Thus, the combination of these secondary outputs by the proposed iterative scheme allows for noise to be effectively removed while also retaining image edges.

In one aspect of the invention, a method for performing image fusion for image processing, comprises: receiving a first input image (I); generating, using a computer processor, N secondary outputs ($I_n$, n=1, 2, ... N−1, N) using N combinations of secondary image processes and/or parameter sets derived from the first input image (I); and fusing the intermediate outputs to yield a processed output (I').

In another aspect of the invention, a method for decoupling local and global contrast enhancement processes for an original image, comprises: performing, using a computer processor, indirect contrast enhancement of the original image to yield a globally contrast-enhanced output; decomposing the original image and the globally contrast-enhanced output using a multi-resolution decomposition process; selecting approximation information of the globally contrast-enhanced output; calculating detail information to restore contrast of the original image based on the approximation information of the globally contrast-enhanced output; composing a fused output using the selected approximation and the detail information; and performing direct contrast enhancement to yield a final output.

In a further aspect of the invention, an iterative method for edge-preserving noise removal of an image, comprises: (a) processing, using a computer processor, the image by generating secondary denoising outputs using varying degrees of smoothing; (b) measuring features of the image; (c) fusing a least aggressively smoothed image with a most aggressively smoothed image based on the features of the image to provide a fused output; (d) fusing the fused output with the most aggressively smoothed image based on the features of the image; and (e) iterating steps (a)-(d) K times, replacing the more aggressively smoothed image with the one calculated in step (d).

In another aspect of the invention, a method of calculating HVS-based multi-scale transforms based on luminance and contrast masking characteristics of the HVS, comprises: calculating a multi-resolution transform to yield a set of approximation and detail coefficients; using the approximation coefficients to mask the detail coefficients to yield multi-scale luminance-masked contrast coefficients; using the luminance-masked contrast coefficients at different levels of decomposition to mask the luminance-masked contrast coefficients to yield the multi-scale luminance and contrast-masked coefficients.

In another aspect of the invention, a method for multi-scale de-noising using HVS-based multi-scale transforms, comprises: performing, using a computer processor, a multi-resolution decomposition of an image; de-noising the image by: de-noising contrast coefficients; and/or smoothing approximation coefficients; inferring the smoothed contrast coefficients using the smoothed approximation coefficients; and performing an inverse transform to generate an output image.

In another aspect of the invention, a method for generating a set of image fusion processes based on an adaptive-weighting scheme based on structural similarity, comprises: performing, using a computer processor, multi-resolution processing to source images; fusing approximation coefficients to yield an initial fusion estimate of the approximation coefficients; recalculating weights for averaging of the approximation coefficients based on a similarity between the initial fusion estimate and each of the source images; fusing contrast coefficients using a contrast coefficient fusion process; and performing an inverse transform to generate an output.

BRIEF DESCRIPTION OF THE DRAWINGS

The foregoing features of this invention, as well as the invention itself, may be more fully understood from the following description of the drawings in which.

DETAILED DESCRIPTION

Figure 1:
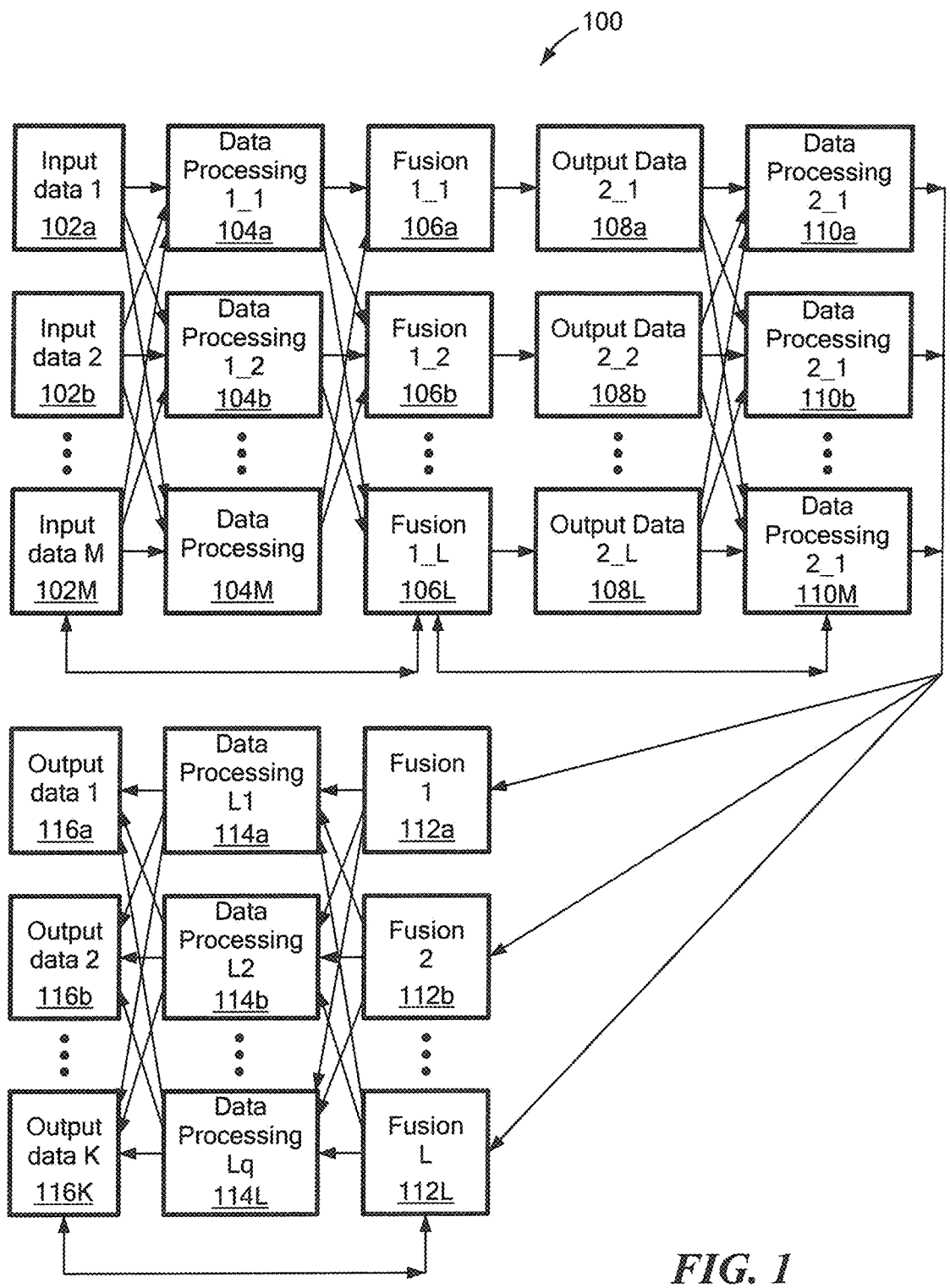
FIG. 1 is a block diagram of a system having image processing fusion system in accordance with an embodiment of the present invention.

FIG. 1 shows an exemplary image processing system 100 having fusion in accordance with exemplary embodiments of the invention. First, second, and third input data 102a-M are input to each of first, second, and third data processing modules 104a-M. It is understood that any practical number of input data and processing modules can be used. The output of each of the data processing modules 104a-M is provided to each of first, second and third fusion modules 106a-L each generating a respective output data 108a-L. The output data 108 are provided to each data processing module 110a-L the outputs of which are provided to fusion modules 112*a*-L. Data processing modules 114*a*-L receive the output from fusion modules 112 to generate respective output data-K, as described more fully below.

Figure 2:
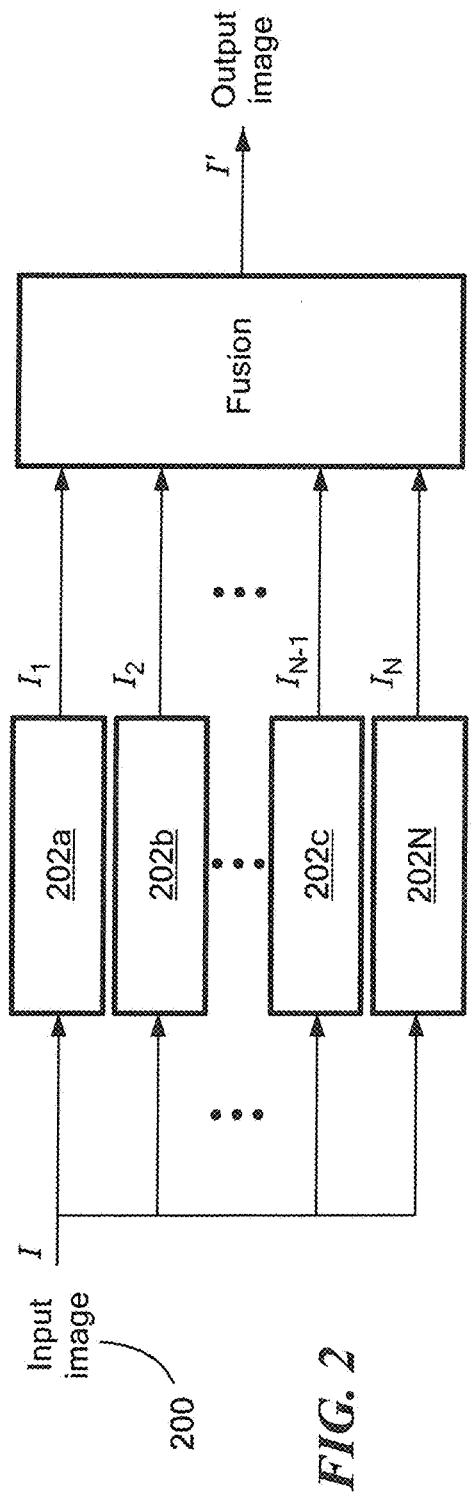
FIG. 2 is a diagram of a system having a plurality of processing modules to receive and process an input image and a fusion module.

FIG. 2 shows exemplary image enhancement of a scene. An input image 200 is provided to a series of image processing modules 202*a*-N each providing particular image enhancement processing with various parameter sets to generate N secondary outputs $I_n$, n=1, 2, ..., N−1, N) from the single input image 200. In a sense, these secondary outputs emulate the multiple source images which are assumed to be available in multi-sensor data fusion applications. The secondary outputs $I_{1-N}$ are then provided to a fusion module 204 that yields an enhanced output image I'.

Due to the fusion processing, the enhanced output image I' is an effective combination of the secondary outputs which fuse the advantages of each of the secondary enhancement processes. In this context, a variety of suitable image enhancement processes can be used. The output of the system will be especially dissimilar from the secondary outputs when the secondary outputs are themselves dissimilar.

It is understood that where image process K, k=1, 2, ... N, can be the commonly used or new development image enhancement processes, it can be shown that the system is a generalized and theoretically sound framework for image processing. For example, when all the secondary outputs are equivalent, e.g., $I_0=I_1=\ldots=I_{NA}=I_N$, then $I'=I_0$. Therefore, any image enhancement process can be viewed as an instance of the inventive system when the same image enhancement algorithm is used to generate each of the N secondary outputs. Furthermore, if $I_0=I_1=\ldots=I_{N-1}=I_N=I$, then I'=I. Therefore, if the secondary processes are parametric for which a given parameter set yields the original image, there is a parameter set which will yield the original image by an inventive system.

Exemplary embodiments exhibit a recursive structure if the secondary enhancements are the proposed enhancement system itself. In this case, different fusion approaches can be used in the secondary enhancement stages, as well as in the final stage, which fuses secondary outputs. Similar formulations can be derived for other image processing applications, including the denoising application described herein. The proposed framework in the context of image enhancement, image denoising, and edge detection are illustrated in FIGS. 3, 4, and 5, respectively.

Figure 3:
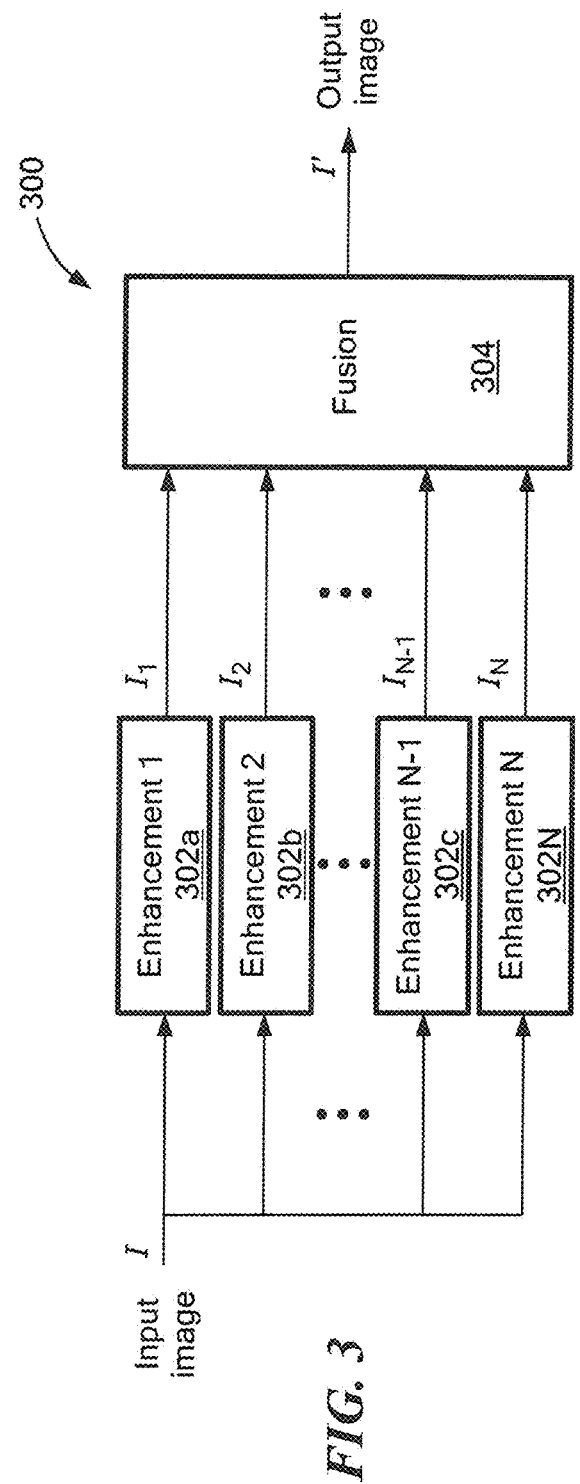
FIG. 3 is a diagram of a system having image enhancement modules to receive and process an input image and a fusion module.

FIG. 3 shows an image enhancement system 300 having a first enhancement module 302*a* outputting $I_1$, a second enhancement module 302*b* outputting $I_2$, a third enhancement module 302*c* outputting $I_{N-1}$, and a fourth enhancement module 302N outputting $I_N$. In other embodiments, instead of enhancement modules, denoising modules and/or edge detection modules can be used for image denoising/edge detection applications. It is understood that any practical number and type of enhancement process can be used.

Figure 4:
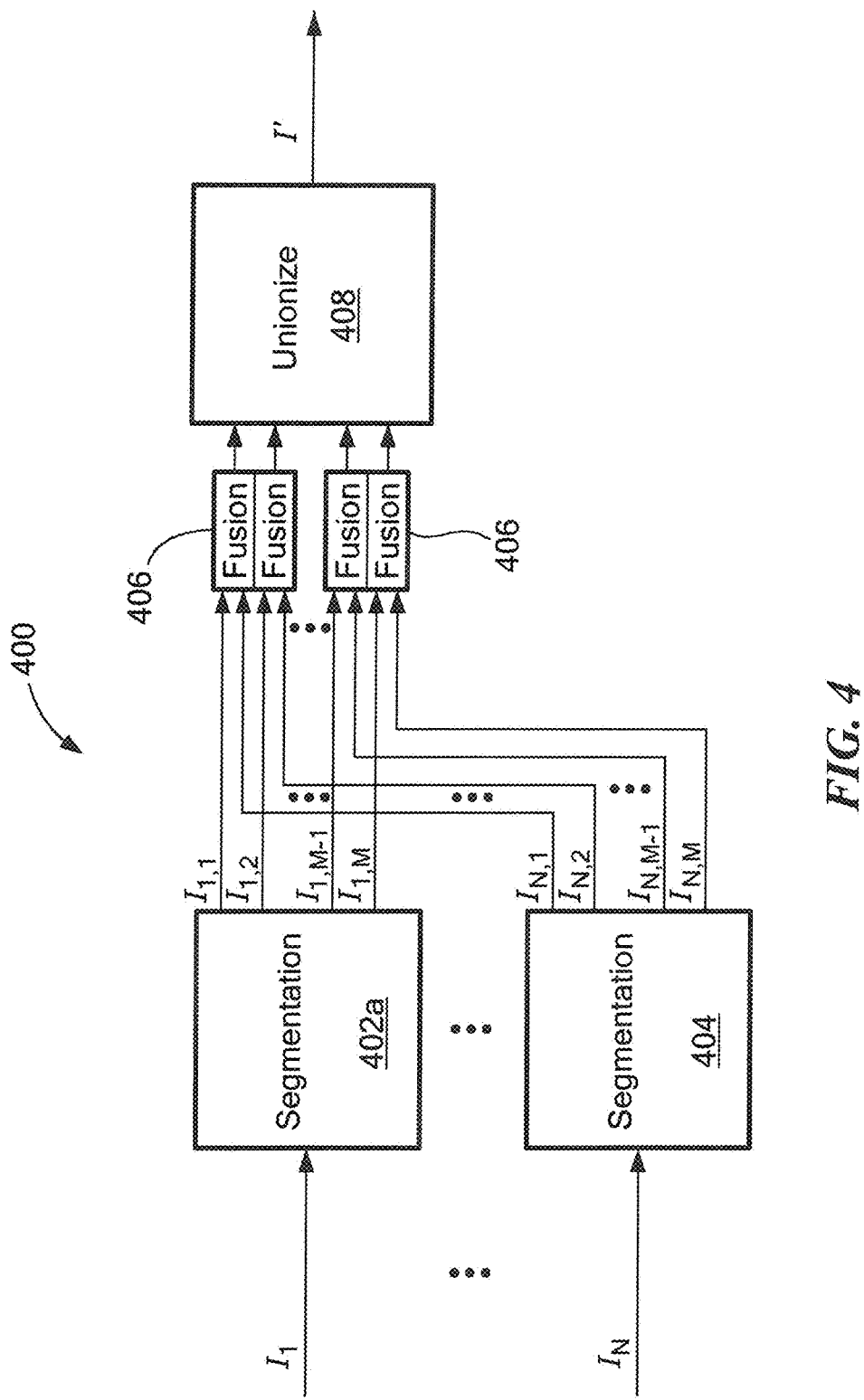
FIG. 4 is a diagram of a system having segmentation and fusion of sub-images that are unionized.
Figure 5:
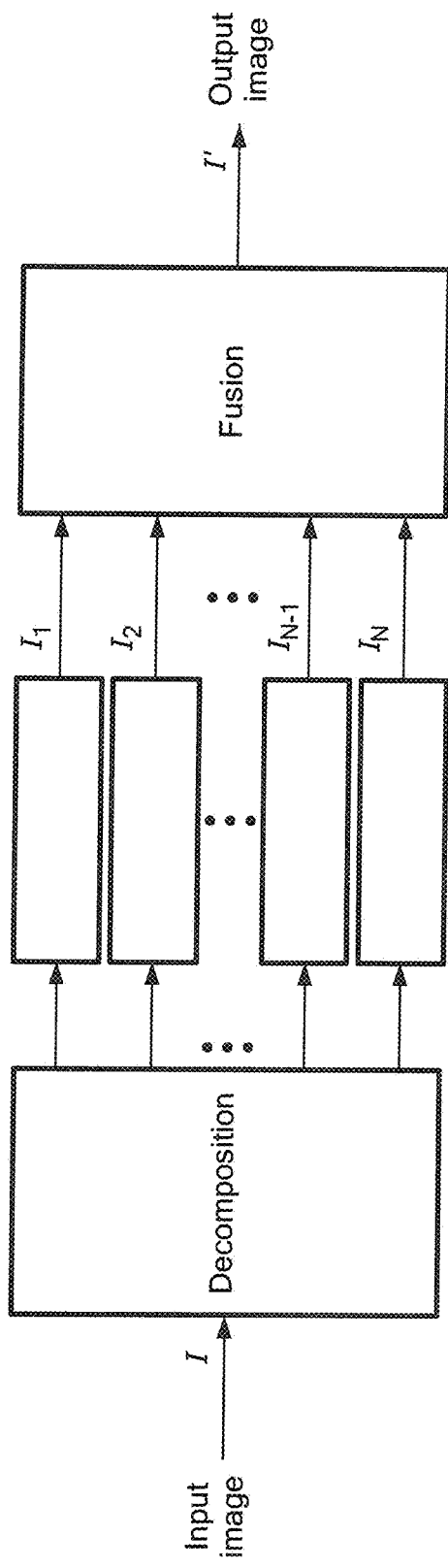
FIG. 5 is a diagram of a system having decomposition, processing modules, and fusion.

FIG. 4 shows an exemplary system 400 decomposing secondary images into M sub-images using a segmentation approach, and fusing each sub-image of each the secondary images. A first second image $I_1$ is provided to a first segmentation module 402, which outputs sub-images $I_{1,1}, I_{1,2}, \ldots I_{1,M-1}, I_{1,M}$, and a second image $I_N$ is provided to a second segmentation module 404, which outputs sub-images $I_{N,1}, I_{N,2}, \ldots I_{N,M-1}, I_{N,M}$. It is understood that any practical number of input images and segmentation modules can be used. The sub-images are processed by fusion modules 406 which provide outputs to unionization module 408.

It is understood that the sub-images can be fused in various ways. For example, Human Visual System (HVS)-based decomposition may be used to decompose sub-images based on the human eye's ability to discriminate between important and unimportant data. Each sub-image may then be fused according to a fusion scheme which accurately addresses the features of each sub-image. The fused sub-images are unionized to yield the final fused output. The fusion 406 of FIG. 4 can be used as the fusion in the generalized system in FIG. 1.

In one embodiment, the input image is decomposed into N grayscale representations by bi-dimensional empirical mode decomposition, for example. This differs from the system of FIG. 4 as the domains of each representation are equal, whereas the system in FIG. 5 decomposes the image into non-overlapping regions. Each grayscale representation from the decomposition is separately processed and fused to yield the output image, as shown in FIG. 5.

In another aspect of the invention, a system effectively combines indirect and direct image enhancement procedures. Indirect and direct image enhancement processing are based on different criteria so that their respective outputs may be complementary in nature. Indirect approaches generally improve global contrast, but indirectly alter the edge information of images in an erratic manner. Consequently, the original edge information of the image may either not be accurately preserved or may be over-enhanced. Conversely, direct image enhancement procedures are more suitable for local edge enhancement.

Figure 6:
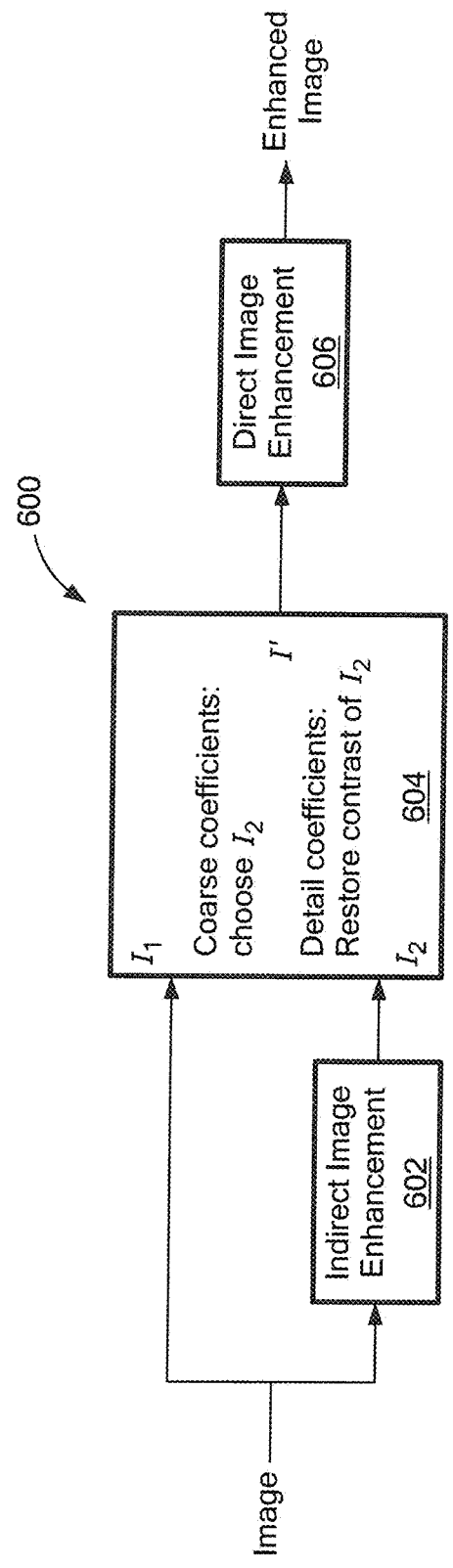
FIG. 6 is a diagram of decoupling of global and local image enhancement.

In one embodiment, a method uses a priori knowledge to decouple global and local enhancement procedures, allowing them to be tuned independently. FIG. 6 shows an exemplary process 600 in which an image is first subjected to a modified global contrast enhancement process, which can be viewed as a specific instance of the generalized system, where the secondary outputs $I_1$ and $I_2$ are the original image and the output of an indirect image enhancement process 602, respectively, and where the fusion process 604 makes direct use of the a priori knowledge. The direct image enhancement 606 outputs the enhanced image.

The fusion process begins by performing an L-level decomposition of $I_1$ and $I_2$ using a multi-resolution decomposition scheme. This decomposition generates the approximation coefficient sub-bands $y_{I_1,0}^{(l)}$, $y_{I_2,0}^{(l)}$ and i detail coefficient sub-bands $y_{I_1,i}^{(l)}$, $y_{I_2,i}^{(l)}$ at each decomposition level l for $I_1$ and $I_2$, respectively. For this stage, any multi-resolution decomposition scheme may be used. Here, the Laplacian Pyramid (LP) is used to illustrate the approach, in which case, i=1. Assuming that the approximation coefficients $y_{I_2,0}^{(L)}$ adequately represent the desired global contrast enhancement, the approximation coefficients of the fused image at level L are given by $$y_{I_{enh},0}^{(L)} = y_{I_2,0}^{(L)} \qquad (1)$$

The detail coefficients of the fused output restore the contrast information of the original image in order to accurately preserve its edges. Since the human visual system is sensitive to relative luminance changes, the detail coefficients of the original image are scaled according to the luminance changes resulting from the global contrast enhancement. The exact means by which this is accomplished depends on the multi-resolution decomposition scheme used by the fusion approach. For the case of the LP, the contrast of the original image is restored by $$y_{I',i}^{(l)} = y_{I_1,i}^{(l)} \frac{\text{EXPAND}(y_{I_2,i+1}^{(l)})}{\text{EXPAND}(y_{I_1,i+1}^{(l)})} \qquad (2)$$

The inverse transform is performed to yield the image I'. This procedure successfully obtains the global contrast enhancement of the indirect enhancement algorithm while retaining the contrast of the original image. Applying a direct image enhancement 606 to I' thereafter can enhance fine details while still obtaining the advantages of the global contrast enhancement, yielding the final enhanced output $I_{enh}$. Thus, the processing decouples the local and global enhancement procedure from each other and allows them to be tuned independently.

It is understood that a known class of image fusion processing adopts the Parameterized Logarithmic Image Processing (PLIP) model, which is a nonlinear image processing framework whose mathematical operators more consistently correspond to human visual system characteristics. In one embodiment, a fusion system employs PLIP mathematical operators that may be used in the spatial or transform domain based on visual and computational requirements. PLIP is described, for example, in S. Nercessian, K. Panetta, and S. Agaian, "Multiresolution Decomposition Schemes Using the Parameterized Logarithmic Image Processing Model with Application to Image Fusion," EURASIP Journal on Advances in Signal Processing, vol. 2011, Article ID 515084, 17 pages, 2011. doi:10.1155/2011/515084, which is incorporated herein by reference.

The PLIP model interprets images as absorption filters known as graytones based on the maximum range of the image M, and processes these graytones using a new arithmetic which replaces standard arithmetical operators. The resulting set of arithmetic operators can be used to process images based on a physically relevant image formation model. The model makes use of a logarithmic isomorphic transformation, consistent with the fact that the human visual system processes light logarithmically. The model has also shown to satisfy Weber's Law, which quantifies the human eye's ability to perceive intensity differences for a given background intensity. It has been shown that psychophysical laws can be context-dependent, and thus, the constants governing these psychophysical laws are indeed parametric. Thus, the parametric nature of the model allows mathematical operators to be tuned according to image-dependent characteristics. At its core, the model generalizes the isomorphic transformation originally formulated in by the Logarithmic Image Processing (LIP) model. Consequently, a new set of PLIP mathematical operators, namely addition, subtraction, and scalar multiplication, are defined for graytones $g_1$ and $g_2$ and scalar constant c in terms of this isomorphic transformation, thus replacing traditional mathematical operators with nonlinear operators which attempt to characterize the nonlinearity of image arithmetic. Table 1 summarizes and compares the LIP and PLIP model operators, where the specific instance in which $\mu=M$, $\gamma=k=\lambda$, and $\beta=1$, is of particular practical interest. Practically, for images in [0, M), the value of $\gamma$ can either be chosen such that $\gamma \geq M$ for positive $\gamma$ or can take on any negative value.

TABLE 1

| | LIP and PLIP model mathematical operators | |
|---|---|---|
| | LIP Model | PLIP Model |
| Graytone | $g = M - I$ | $g = \mu - I$ |
| Addition | $g_1 \triangle g_2 = g_1 + g_2 - \dfrac{g_1 g_2}{M}$ | $g_1 \tilde{\oplus} g_2 = g_1 + g_2 - \dfrac{g_1 g_2}{\gamma}$ |
| Subtraction | $g_1 \triangle g_2 = M \dfrac{g_1 - g_2}{M - g_2}$ | $g_1 \tilde{\ominus} g_2 = k \dfrac{g_1 - g_2}{k - g_2}$ |
| Scalar Multiplication | $c \triangle g_1 = M - M\left(1 - \dfrac{g_1}{M}\right)^c$ | $c \tilde{\otimes} g_1 = \tilde{\varphi}^{-1}(c\tilde{\varphi}(g_1)) = \gamma - \gamma\left(1 - \dfrac{g_1}{\gamma}\right)^c$ |
| Isomorphic Transformation | $\varphi(g) = -M \ln\left(1 - \dfrac{g}{M}\right)$ | $\tilde{\varphi}(g) = -\lambda \cdot \ln^{\beta}\left(1 - \dfrac{g}{\lambda}\right)$ |
| | $\varphi^{-1}(g) = -M\left[1 - \exp\left(-\dfrac{g}{M}\right)\right]$ | $\tilde{\varphi}^{-1}(g) = \lambda\left[1 - \exp\left(\dfrac{-g}{\lambda}\right)^{\frac{1}{\beta}}\right]$ |
| Graytone Multiplication | $g_1 \triangle g_2 = \phi^{-1}(\phi(g_1)\phi(g_2))$ | $g_1 \tilde{\cdot} g_2 = \tilde{\phi}^{-1}(\tilde{\phi}(g_1)\tilde{\phi}(g_2))$ |
| Convolution | $w \triangle g = \phi^{-1}(w*\phi(g))$ | $w \tilde{*} g = \tilde{\phi}^{-1}(w*\tilde{\phi}(g))$ |

When $\gamma=256$, the PLIP model operators revert to the LIP model operators. Furthermore, it can be shown that $$\lim_{|\gamma|\to\infty} \tilde{\varphi}(a) = \lim_{|\gamma|\to\infty} \tilde{\varphi}^{-1}(a) = a \qquad (3)$$

Since $\tilde{\phi}$ and $\tilde{\phi}^{-1}$ are continuous functions, the PLIP model operators revert to arithmetic operators as $|\gamma|$ approaches infinity and therefore, the PLIP model approaches standard linear processing of graytone functions as $|\gamma|$ approaches infinity. Thus, for the case of image fusion algorithms, an image algorithm which utilizes standard linear processing operators can be found to be an instance of an image algorithm using the PLIP model with $\gamma=\infty$. Therefore, the PLIP framework can generalize any state-of-the-art fusion approach which has been developed or has yet to be developed. Image fusion algorithms can be adapted using the PLIP model by providing a mathematical formulation of multi-resolution decomposition schemes and fusion rules in terms of the model. This may be accomplished by directly replacing standard operators with PLIP operators, or by using the isomorphic transformation which defines the PLIP model. The graytone g of the input image I is first generated. By way of the isomorphic transformation, a multi-decomposition scheme at decomposition level l is calculated by $$\tilde{T}(\tilde{y}_0^{(l)}) = \tilde{\phi}^{-1}(T(\tilde{\phi}(\tilde{y}_0^{(l)}))) \qquad (4)$$

where $\tilde{y}_0^{(0)} = g$. Similarly, the inverse procedure begins from transform coefficients at the highest decomposition level L. Each synthesis level reconstructs approximation coefficients at a scale l<L by each synthesis level by $$\tilde{T}^{-1}(\tilde{T}(\tilde{y}_0^{(l)})) = \tilde{\phi}^{-1}(\tilde{\phi}(\tilde{T}(\tilde{y}_0^{(l)})))) \qquad (5)$$

Given $\tilde{y}_{I_1,0}^{(L)}, \tilde{y}_{I_2,0}^{(L)}, \ldots \tilde{y}_{I_{N-1},0}^{(L)}, \tilde{y}_{I_N,0}^{(L)}$, the approximation coefficients of images $I_1, I_2, \ldots I_{N-1}, I_N$ at the highest decomposition level L, yielded using a given parameterized logarithmic multi-resolution decomposition technique, the approximation coefficients for the fused image I' at the highest level of decomposition according to the PLIP model is given by $$\tilde{y}_{I',0}^{(L)} = \tilde{\phi}^{-1}(R_D(\tilde{\phi}(\tilde{y}_{I_1,0}^{(L)}), \tilde{\phi}(\tilde{y}_{I_2,0}^{(L)}), \ldots, \tilde{\phi}(\tilde{y}_{I_{N-1},0}^{(L)}), \tilde{\phi}(\tilde{y}_{I_N,0}^{(L)})))) \qquad (6)$$

where $R_A$ is an approximation coefficient fusion rule implemented using standard arithmetic operators, respectively. Similarly, for each of the i high-pass sub-bands of each of the N images at each level of decomposition l, the detail coefficient rule performed at each level of decomposition is given by $$\tilde{y}_{I',i}^{(l)} = \tilde{\phi}^{-1}(R_D(\tilde{\phi}(\tilde{y}_{I_1,i}^{(l)}), \tilde{\phi}(\tilde{y}_{I_2,i}^{(l)}), \ldots, \tilde{\phi}(\tilde{y}_{I_{N-1},i}^{(l)}), \tilde{\phi}(\tilde{y}_{I_N,i}^{(l)})))) \qquad (7)$$

FIGS. 7a-h illustrate the improvement which can be yielded in the fusion of multi-sensor data using the inventive class of PLIP image fusion, and the necessity for the added model parameterization. The $Q_W$ quality metric used for quantitatively assessing image fusion performance implies a better fusion for a higher value of $Q_W$. The figure shows that firstly, the PLIP model reverts to the LIP model with $\gamma = M = 256$, and secondly, the combination of source images using this extreme case may still be visually unsatisfactory given the nature of the input images, even though the processing framework is based on a physically inspired model.

Figure 7:
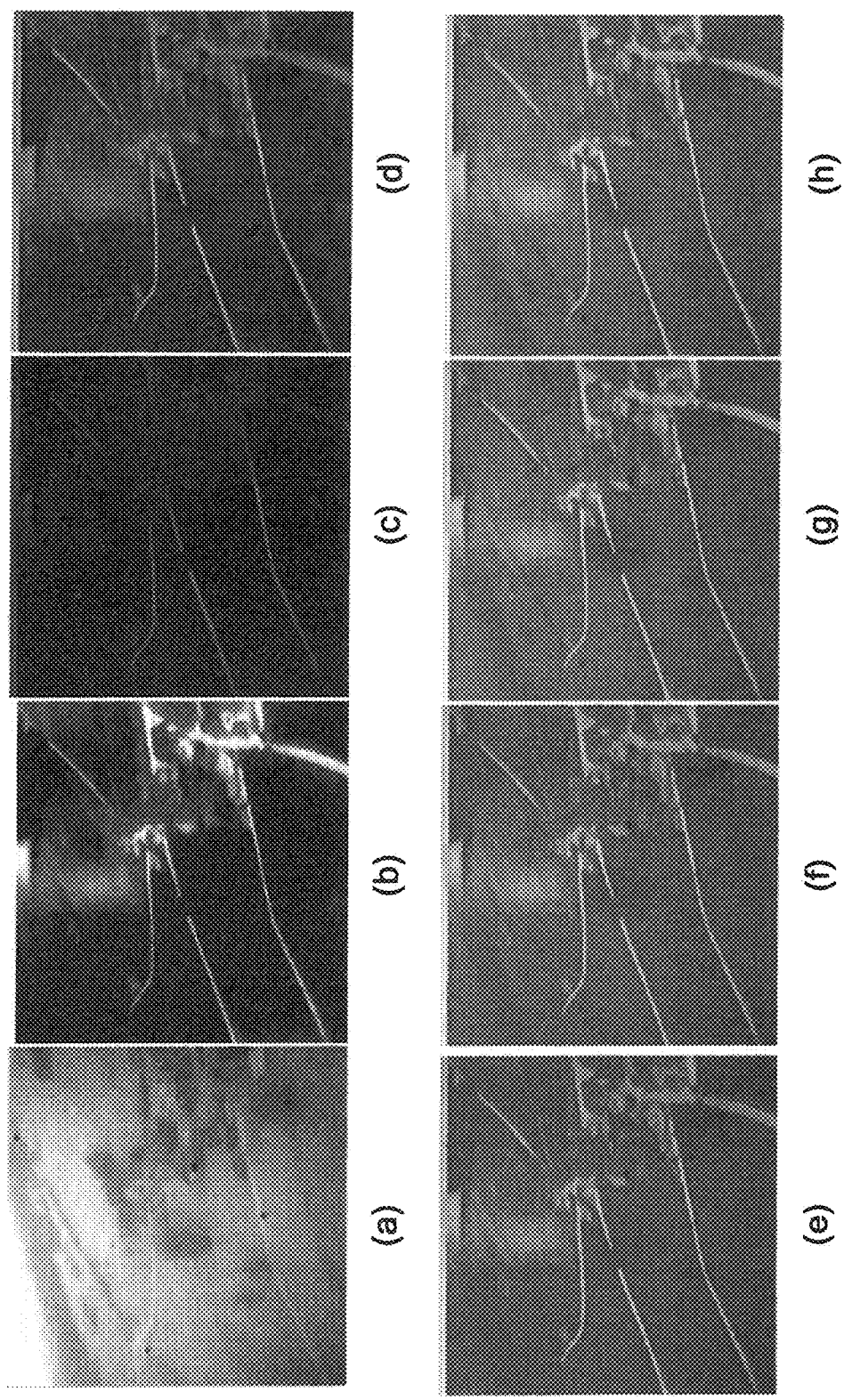
FIGS. 7(a) and (b) show source images and 7(c)-(h) show processed images.

FIGS. 7d-f illustrate the way in which fusion results are affected by the parameterization, with the most improved fusion performance yielded by the proposed approach using parameterized multi-resolution decomposition schemes and fusion rules relative to both the standard processing extreme and the LIP model extreme with $\gamma = 430$.

Figure 8:
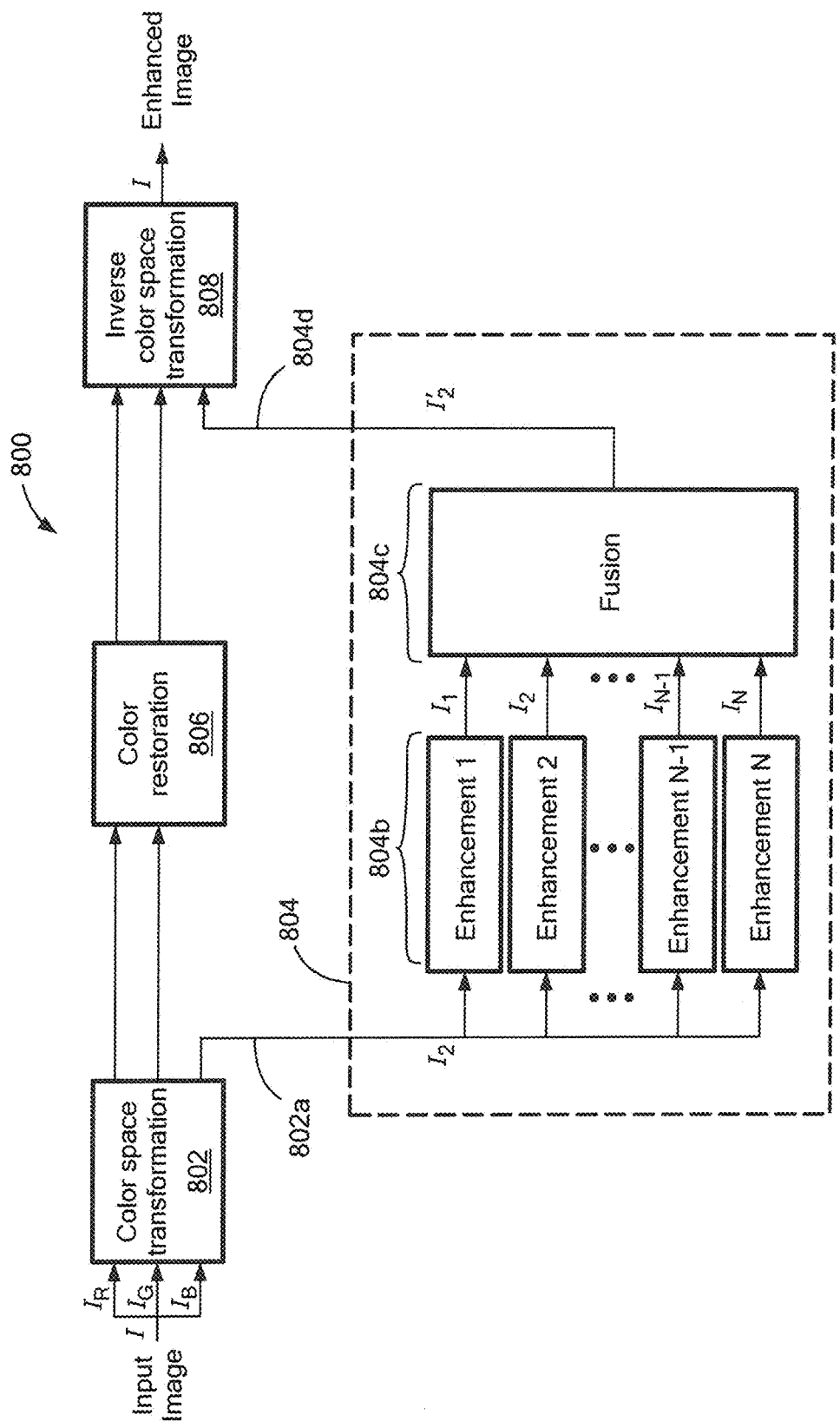
FIG. 8 is a diagram of enhancement of color images.

FIGS. 7a,b are original "navigation" source images, image fusion results using the LP/AM fusion rule, and PLIP model operators with (c) $\gamma = 256$ (LIP model case), $Q_W = 0.3467$, (d) $\gamma = 300$, $Q_W = 0.7802$, (e) $\gamma = 430$, $Q_W = 0.8200$, (f) $\gamma = 700$, $Q_W = 0.8128$ (g) $\gamma = 10^8$, $Q_W = 0.7947$, (h) standard mathematical operators, $Q_W = 0.7947$ The described approaches, as described for grayscale images, can be extended for the case of color images, as shown in FIG. 8. In this embodiment, the RGB color image is first converted 802 to a color space such as HSV, XYZ, YCbCr, PCA, CIELAB, etc. The luminance channel 802a resulting from the color space transformation is subjected to the inventive fusion processing 804 described above where secondary outputs using different enhancement processes 804b are generated and later fused 804c to produce the enhanced luminance channel 804d of the image. Depending on the nature of the color space, the other two channels may be subjected to a color restoration procedure. Performing the inverse color space transformation 808 with inputs from color restoration 806 yields an enhanced RGB output image I'.

In another aspect of the invention, in the context of noise removal from images, an iterative fusion-based technique for image denoising is provided. One issue in image denoising is the tradeoff between effective noise removal and preservation of edges. In one embodiment, a method first generates secondary outputs which differ by their degree of smoothing. The images $I_{1,0}$ and $I_{2,0}$ are the denoising results obtained using the least and most aggressive amounts of smoothing, respectively. The secondary outputs can be generated by any denoising approach, such as Gaussian filtering, anisotropic diffusion, total variation, wavelet approaches, etc. The salient features of $I_{1,0}$, denoted by G, is also determined via an edge detector, statistical filter, or other means. At each iteration k, the aim is to improve edge preservation of $I_{2,k}$ while also effectively denoising the image. This is achieved by iteratively fusing information from $I_{1,k}$ at edge locations by $$I_{1,k+1} = G^\alpha I_{1,0} + (1-G^\alpha) I_{2,k} \qquad (8)$$

$$I_{2,k+1} = G^\alpha I_{1,k+1} + (1-G^\alpha) I_{2,k} \qquad (9)$$

where α is a parameter controlling the influence of G on the fusion process. It is seen that this procedure can effectively inject the edge information from $I_{1,k}$ into $I_{2,k}$ while contributing substantially less noise. Thus, the inventive approach can be iterated K times, in which case the final denoising result is given by $I_{2,K}$.

In another aspect of the invention, exemplary embodiments perform image enhancement, image de-noising, and image fusion. Secondary outputs can be fused together by exemplary embodiments of the invention. Fusion processing can be used both to generate secondary outputs, as well as to fuse secondary outputs to achieve the final output image. This processing make use of a novel set of HVS-inspired multi-scale tools that define multi-scale contrast coefficients in a way which is consistent with the HVS, and alter multi-scale contrast coefficients for achieving various applications in signal and image processing.

The HVS perceives relative luminance changes for a large range of background intensity values. Known as the luminance masking (LM) phenomena, the degree to which the HVS is sensitive to relative, and not absolute, luminance differences varies with background illumination. Additionally, the HVS is sensitive not only to relative changes in luminance, but also to relative changes in contrast. This contrast masking (CM) phenomena of HVS is one in which the visibility of a certain stimulus is reduced due to the presence of another one. Accordingly, we formulate HVS-inspired multi-scale transforms on the LM and CM phenomena of the HVS. In this case, the transforms are developed by directly emulating the HVS masking effects on transform domain coefficients. It should be noted that any existing multi-scale signal representation scheme can be used as the base transform for our HVS-inspired multi-scale transform formulation and processing.

Figure 9:
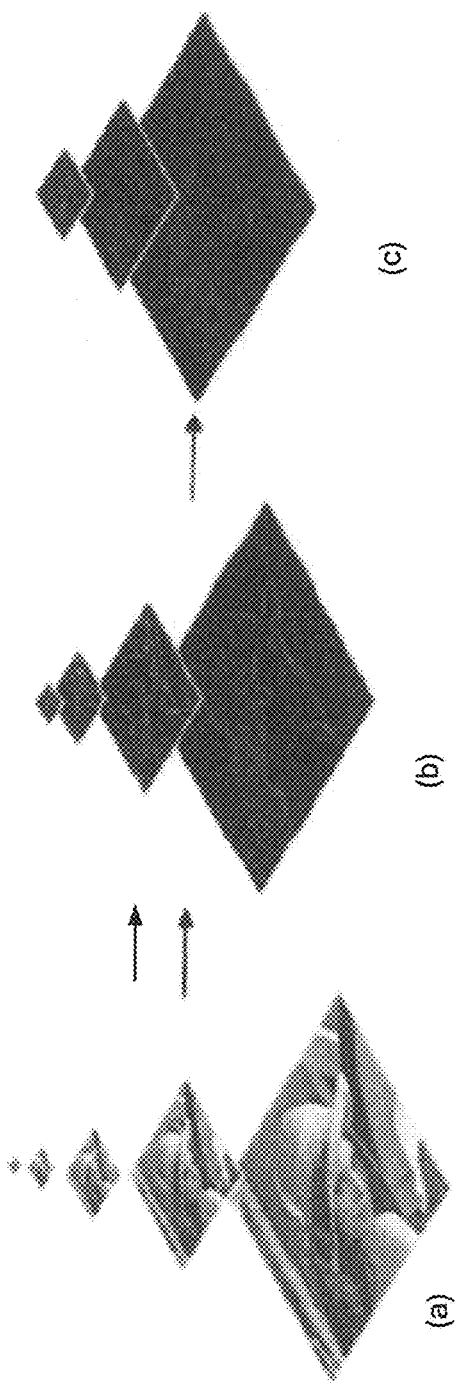
FIG. 9 shows a graphical representation of (a) approximation, (b) detail, and (c) HVS-based contrast coefficient subbands.

FIGS. 9a-c show a graphical depiction of the generation of (a) approximation, (b) detail and (c) HVS-inspired contrast coefficient sub-bands (absolute magnitudes) using the LP as the base transform.

Given the approximation and detail coefficients yielded using a standard multi-scale transform, the inventive contrast measure first measures the LM contrast. The exact means by which this is accomplished is dependent on the given transform. In the LP domain, the LM contrast is given by $$C_{LM}^{(n)} = \frac{y_1^{(n)}}{a_1 + |\bar{y}_0^{(n+1)}|^{\gamma_1}} \qquad (10)$$

where a1 is a small constant, γ1 is a parameter which controls the degree to which the luminance-masked contrast is affected by the background luminance, and $\bar{x}$ is an expansion function consisting of some up-sampling and interpolation operation. For the pyramidal-based approaches, the expansion is given by $$\bar{x} = \text{EXPAND}(|x|) \quad (11)$$

and for the wavelet-based approaches, it is given by $$\bar{x} = \hat{g}_R * \lfloor \hat{g}_C * /|x|/_{\uparrow 2_R} \rfloor_{\uparrow 2_C} \quad (12)$$

The LM contrast is then masked with a local activity measure, which is a function of the LM contrast, to yield the proposed luminance and contrast masked (LCM) contrast. Again, the manner in which this is accomplished depends on the base transform which is employed. In the context of the LP, the multi-scale LCM contrast is defined as:

$$C_{LCM}^{(n)} = \frac{C_{LC}^{(n)}}{a_2 + |\overline{C}_{LC}^{(n+1)}|^{\gamma_2}} \quad (13)$$

where $a_2$ is a small constant, and $\gamma_2$ is a parameter which controls the degree to which the perceived contrast is affected by surrounding stimuli, as illustrated in FIGS. 9a-c. With $a_1 = a_2 = \gamma_1 = \gamma_2 = 0$, the contrast reverts the detail coefficients given by standard multi-scale transforms.

Other combinations incorporate the LM and CM characteristics of the HVS with degrees dictated by $\gamma_1$ and $\gamma_2$. Thus, the contrast measure generalizes existing multi-scale transforms and algorithms using said transforms, in a manner which is motivated by known and relevant HVS characteristics.

The standard transform coefficients can be recovered from the multi-scale LCM coefficients. For example in the LP domain, the LM contrast can be calculated from the LCM contrast by $$C_{LM}^{(n)} = C_{LCM}^{(n)} \cdot [a_2 + |C_{LC}^{(n+1)}|^{\gamma_2}] \quad (14)$$

and the detail coefficients are calculated in terms of the LM contrast by (n)

$$y_1^{(n)} = C_{LM}^{(n)} \cdot [a_1 + |\bar{y}_0^{(n+1)}|^{\gamma_1}] \quad (15)$$

The standard LP synthesis procedure can then be used to reconstruct the image signal. As the inventive HVS masking is a completely invertible procedure, a novel class of multi-scale transforms is achievable, which combines HVS characteristics with commonly used multi-resolution decomposition schemes. Accordingly, the HVS-LP, HVS discrete wavelet transform (HVS-DWT), HVS stationary wavelet transform (HVS-SWT), and HVS dual-tree complex wavelet transform (HVS-DT-CWT) are provided. The analysis and synthesis steps required to calculate each of these HVS-inspired transforms are given in Table 2. In each case, the analysis stage masks detail coefficients first by a measure of local luminance and then by a measure of local activity to yield the HVS-inspired contrast. Each synthesis stage recovers the details coefficients from the HVS contrast coefficients.

TABLE 2

Analysis and synthesis stages of the proposed HVS-inspired multi-scale transforms

|  |  | HVS-LP | HVS-DWT | HVS-SWT | HVS-DT-CWT |
|---|---|---|---|---|---|
| Analysis | LM | $C_{LM}^{(n)} = \dfrac{y_1^{(n)}}{a_1 + |\bar{y}_0^{(n+1)}|^{\gamma_1}}$ | $C_{i,LM}^{(n)} = \dfrac{y_i^{(n)}}{a_1 + |y_0^{(n)}|^{\gamma_1}}$ | $C_{i,LM}^{(n)} = \dfrac{y_i^{(n)}}{a_1 + |y_0^{(n)}|^{\gamma_1}}$ | $C_{i,LM}^{(n)} = \dfrac{y_i^{(n)}}{a_1 + |y_0^{(n+1)}|^{\gamma_1}}$ |
|  | CM | $C_{LCM}^{(n)} = \dfrac{C_{LM}^{(n)}}{a_2 + |\overline{C}_{LM}^{(n+1)}|^{\gamma_2}}$ | $C_{i,LCM}^{(n)} = \dfrac{C_{i,LM}^{(n)}}{a_2 + |\overline{C}_{i,LM}^{(n+1)}|^{\gamma_2}}$ | $C_{i,LCM}^{(n)} = \dfrac{C_{i,LM}^{(n)}}{a_2 + |\overline{C}_{i,LM}^{(n+1)}|^{\gamma_2}}$ | $C_{i,LCM}^{(n)} = \dfrac{C_{i,LM}^{(n)}}{a_2 + |\overline{C}_{i,LM}^{(n+1)}|^{\gamma_2}}$ |
| Synthesis | CM | $C_{LM}^{(n)} =$ $C_{LCM}^{(n)} \cdot [a_2 + |\overline{C}_{LM}^{(n+1)}|^{\gamma_2}]$ | $C_{i,LM}^{(n)} =$ $C_{i,LCM}^{(n)} \cdot [a_2 + |\overline{C}_{i,LM}^{(n+1)}|^{\gamma_2}]$ | $C_{i,LM}^{(n)} =$ $C_{i,LCM}^{(n)} \cdot [a_2 + |C_{i,LM}^{(n+1)}|^{\gamma_2}]$ | $C_{i,LM}^{(n)} =$ $C_{i,LCM}^{(n)} \cdot [a_2 + |\overline{C}_{i,LM}^{(n+1)}|^{\gamma_2}]$ |
|  | LM | $y_1^{(n)} =$ $C_{LM}^{(n)} \cdot [a_1 + |\bar{y}_0^{(n+1)}|^{\gamma_1}]$ | $y_i^{(n)} =$ $C_{i,LM}^{(n)} \cdot [a_1 + |y_0^{(n)}|^{\gamma_1}]$ | $y_i^{(n)} =$ $C_{i,LM}^{(n)} \cdot [a_1 + |y_0^{(n)}|^{\gamma_1}]$ | $y_i^{(n)} =$ $C_{i,LM}^{(n)} \cdot [a_1 + |y_0^{(n+1)}|^{\gamma_1}]$ |

Figure 10:
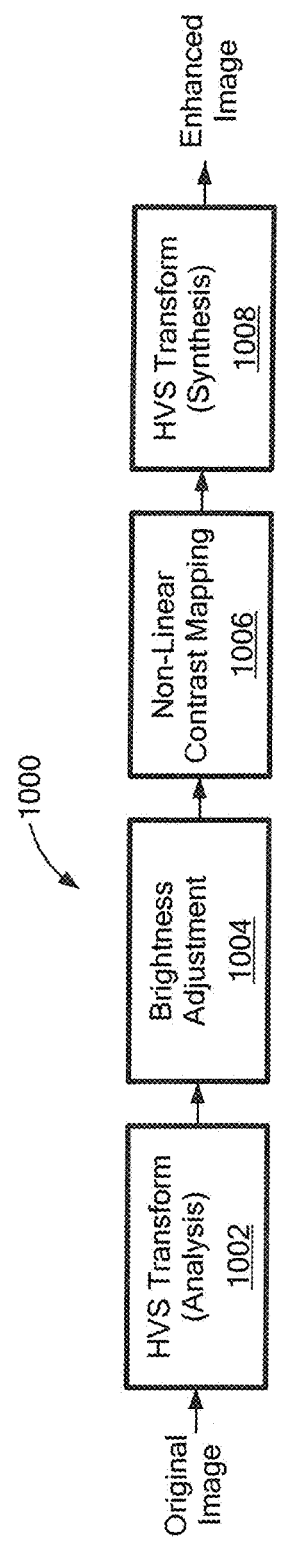
FIG. 10 is a diagram showing HVS image enhancement.

FIG. 10 shows an exemplary system providing image enhancement processing based on HVS multi-scale transforms. A forward HVS multi-scale transform 1002 is applied to the original image. The brightness of the image is adjusted 1004 by altering the approximation coefficient sub-band at the highest level of decomposition. Non-linear contrast mapping 1006 is applied to the human visual contrast coefficient sub-bands at each orientation and level of decomposition. In this stage, both contrast enhancement and dynamic range compression can be applied. Lastly, the inverse HVS transform 1008 is performed, yielding the enhanced image.

In addition to enhancing the contrast of certain image structures, an image enhancement process should also provide a (preferably direct) means of achieving dynamic range compression and global brightness adjustments as deemed necessary for the given input image data. There may also be instances in which the necessities for an adequate image enhancement are contradictory to the requirements dictated by a contrast enhancement framework, in which case these requirements must be relaxed.

The extension of existing direct multi-scale contrast enhancement frameworks to a more general direct multi-scale image enhancement framework demands that some additional requirements of contrast enhancement schemes be added. One such requirement is that the direct enhancement procedure should yield a visually pleasing level of brightness. Thus, upon decomposing the input image into its multiple sub-bands, the brightness of the image is first adjusted. One of the most common means of brightness adjustment is by a power law transformation. However, power law transformations will perform simultaneous brightness adjustments, dynamic range compression, and thus, the degree to which they are tuned cannot be controlled independently or directly. Equalization techniques have also been considered. However, they may not accurately preserve edges as the local edge content is erratically treated. Given a suitable contrast measure which accurately encompasses elements of human vision, the brightness of the image can be sufficiently and accurately adjusted by adding a constant to the approximation coefficient sub-band at the highest level of decomposition. Again, exemplified in the case of the LP, the brightness of the image is tuned by $$y'_0{}^{(N)} = y_0{}^{(N)} + L \qquad (16)$$

where L is a brightness parameter. With L=0, the current brightness level of the image is preserved.

The extension to a more general direct image enhancement framework also demands that some additional requirements mandated by contrast enhancement schemes be relaxed depending on the image context. This is to say that direct image enhancement procedures should provide a means of directly achieving both contrast enhancement and dynamic range compression. For example, non-uniformities in lighting and shadows can be perceived as large-scale contrast, and magnifying these contrasts may only exacerbate these negative effects. Thus, there may be instances in which overall visual quality is improved by compressing, or reducing the contrast which is exhibited at a given scale. To this end, we relax the requirements of a non-linear mapping. Specifically, if the contrast at a given scale is to be enhanced, areas of low contrast should be enhanced more than areas of high contrast, and in this case the non-linear contrast mapping function should not cause smoothing. However, if the contrast is to be decreased, for example to remove non-uniform illumination, or to avoid signal clipping because caused by the brightness adjustment step, areas of low contrast should have their contrast decreased less than areas of high contrast, and the non-linear mapping function should not cause contrast enhancement. Accordingly, the HVS-inspired contrast non-linearly mapped by $$C'_{LCM,i}{}^{(n)} = \text{sgn}(C_{LCM,i}{}^{(n)}) \lambda_i{}^{(n)}(|C_{LCM,i}{}^{(n)}|) \qquad (17)$$

where the proposed non-linear contrast mapping function $\lambda_i^{(n)}(\bullet)$ is $$\lambda_i^{(n)}(x) = \begin{cases} g_1^{(n)} \cdot x & x \leq T_i^{(n)} \\ g_2^{(n)} \cdot x + (g_1^{(n)} - g_2^{(n)}) T_i^{(n)} & x > T_i^{(n)} \end{cases} \qquad (18)$$

and $g_1^{(n)} \geq g_2^{(n)} \geq 0$. This formulation allows (1) gain factors less than 1 to be considered for dynamic range compression, (2) the enhancement of high contrast areas to be tuned, and (3) an extension of the non-linear mapping to the DT-CWT coefficients in which phase is preserved. Therefore, the inventive image enhancement allows for the brightness and amount of contrast enhancement/dynamic range compression to be controlled directly and independently of each other, maintaining the spirit of a direct enhancement framework. To summarize the exact means by which direct image enhancement is achieved, the inventive process, as formulated for an N level HVS-LP decomposition, is described as follows:

1) Generate an N+1 level Laplacian pyramid of I
2) Measure the LM contrast of the original image
3) Measure the LCM contrast of the original image
4) Initialize $y'_0{}^{(N+1)} = y_0{}^{(N+1)}$, $C'_{LM}{}^{(n)} = C_{LM}{}^{(n)}$.
5) Adjust the brightness
6) Calculate the enhanced LCM contrast by a non-linear mapping
7) Calculate the enhanced LM contrast by $$C'_{LM}{}^{(n)} = C'_{LCM}{}^{(n)} \cdot [a_2 + |\overline{C}'_{LM}{}^{(n+1)}|^{\gamma_2}]$$

8) Calculate the enhanced detail coefficients by $$y'_1{}^{(n)} = C'_{LM}{}^{(n)} \cdot [a_1 + |\overline{y}'_0{}^{(n+1)}|^{\gamma_1}]$$

9) Calculate the enhanced approximation coefficients by $$y'_0{}^{(n)} = y'_1{}^{(n)} + \text{EXPAND}[y'_0{}^{(n+1)}]$$

10) The enhanced image $I' = y'_0{}^{(0)}$

A similar formulation of the image enhancement algorithms is developed for the other HVS multi-scale transforms whose analysis and synthesis stages were summarized in Table 2.

Due to the generalized formulation of the proposed approach, the processing encapsulates many existing multi-scale image enhancement approaches. Table 3 summarizes direct enhancement processes which are generalized by the proposed approach. The proposed image enhancement processing not only uses a more comprehensive multi-scale model of the HVS, but also extends the use of non-linear detail coefficient mappings to HVS-inspired contrast coefficients, and is capable of adjusting the overall brightness of the enhanced result and achieving dynamic range compression.

TABLE 3

Comparison of existing direct enhancement algorithms with proposed method

| Direct Enhancement | $\gamma_1$ | $\gamma_2$ | Coefficient mapping | Brightness Adjustment | Dynamic Range Compression |
| --- | --- | --- | --- | --- | --- |
| Multi-scale Unsharp-Masking | 0 | 0 | Linear | No | No |
| Laine's Algorithm | 0 | 0 | Non-Linear | No | No |
| Tang's Algorithm | 1 | 0 | Linear | No | No |
| Inventive method | Variable | Variable | Non-linear | Yes | Yes |

The inventive HVS-inspired multi-scale transforms are also useful for image de-noising. Here, we exemplify the HVS-inspired multi-scale transforms for image de-noising, and introduce a HVS-inspired multi-scale de-noising process based on the non-local means (NLM) principle, in which relevant patches within images are used as self-predictions for edge-preserving smoothing. The motivation for the inventive processing is to combine the state-of-the-art performance of the NLM algorithm with the advantages of multi-scale de-noising approaches, and additionally, multi-scale human visual processing. The extension of the NLM algorithm to the multi-scale case can have various related interpretations with some subtle differences. As with all multi-scale de-noising approaches, the presented approach de-noises the edge structures occurring at different scales, as given by the coefficient sub-bands at each level of decomposition. Moreover, it can also be perceived as a extension of the NLM process in which multiple similarity windows are considered.

In practice, the NLM de-noising procedure is a spatial domain procedure which uses a weighted sum of pixels within a square search window $W_1$ of the central pixel to be de-noised. For each pixel of the noisy image, the weights in the local window are calculated by $$w_{k,l}(k', l') = \frac{1}{Z(k, l)} \exp\left[ \frac{\|I_n(\aleph_{k,l}) - I_n(\aleph_{k',l'})\|_{2,a}^2}{h^2} \right] \qquad (19)$$

$$Z(k, l) = \sum_{(k',l') \in W_1} \exp\left[\frac{\|I_n(\aleph_{k,l}) - I_n(\aleph_{k',l'})\|_{2,a}^2}{h^2}\right] \quad (20)$$

where h is a smoothing parameter. The term $\|I_n(\aleph_{k,l}) - I_n(\aleph_{k',l'})\|_{2,a}^2$ is the $l_2$ norm between the neighborhood centered around pixels (k,l) and (k',l'), $\aleph_{k,l}$ and $\aleph_{k',l'}$ respectively, which have been weighted using a Gaussian square profile $W_2$ of standard deviation a. At each pixel, image de-noising is achieved using the NLM process achieved by $$\hat{I}(k, l) = \sum_{(k',l') \in W_1} w_{k,l}(k', l') I_n(k', l') \quad (21)$$

Figure 11:
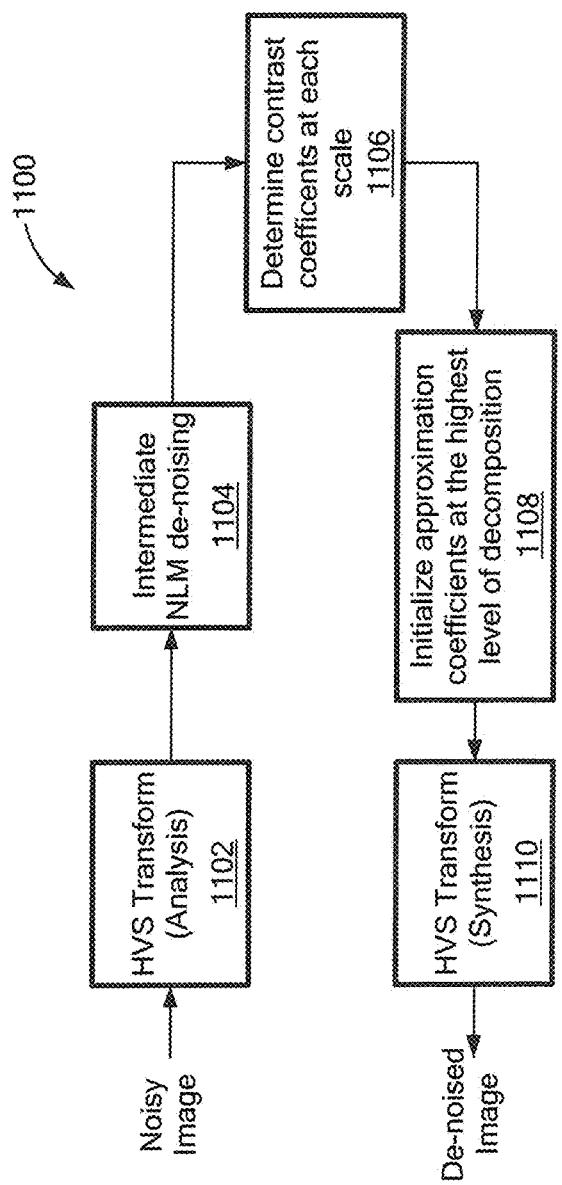
FIG. 11 is a diagram of image denoising.

FIG. 11 shows a block diagram of an exemplary multi-scale NLM process 1100 referred to as the HVS-NLM. Firstly, the image is decomposed 1102 using any of the HVS-transforms described above, for example. Secondly, de-noising 1104 is applied at each level of decomposition. A NLM filtering stage 1106 acts as an intermediary de-noising step. Namely, the approximation coefficients at each level of decomposition are determined, and the NLM procedure is applied. The intermediate approximation coefficients at each level of decomposition are given by $$\hat{y}_{0,int}^{(n)} = NLM(y_0^{(n)}, h^{(n)}) \quad (22)$$

where $h^{(n)}$ is the smoothing parameter at a given scale n. In order to perform level dependent smoothing in accordance to the intuition in which lower levels of decompositions are smoothed more aggressively than higher ones, the smoothing parameter at each scale is defined as $$h^{(n)} = \frac{h^{(0)}}{\eta} \quad (23)$$

Where $\eta$ is a parameter defining the relationship between smoothing factors at each level of decomposition. The approximation coefficient sub-band at the highest level of decomposition 1108 can be defined as either $$\hat{y}_0^{(N)} = NLM(y_0^{(N)}, h^{(N)}) \quad (24)$$

or $$\hat{y}_0^{(N)} = y_0^{(N)} \quad (25)$$

This is a subtle implementation option, in which the approximation sub-band at the highest level of decomposition can chosen to either be de-noised or not. The detail coefficients at each level of decomposition are determined by performing a single level analysis on each intermediate approximation coefficient sub-band by $$(\hat{y}_1^{(n)}, \hat{y}_2^{(n)}, \ldots, \hat{y}_{isb}^{(n)}) = T(\hat{y}_{0,int}^{(n-1)}) \quad (26)$$

Because the processed detail coefficients at each level of decomposition as well as the approximation coefficients at the highest level of decomposition have now been determined, the transform space of the de-noised result is sufficiently filled. The de-noised image can be calculated by performing 1110 the inverse transform $$\hat{I} = T^{-1}(\hat{y}_0^{(N)}, \hat{y}_1, \ldots, \hat{y}_{isb}) \quad (27)$$

In another aspect of the invention, a set of image fusion processes based on the HVS-inspired multi-scale tools are provided with inventive fusion of perceptually-based contrast coefficients provided by these transforms and a novel means of fusing approximation coefficients based on an adaptive similarity-based weighting scheme. Accordingly, the proposed approximation coefficient rule is developed, using the HVS-LP for this specific formulation. The proposed approximation coefficient rule begins by first computing an estimate of the fused approximation coefficients, given by the uniform average $$y_{i_{F,0}}^{(N)} = \frac{y_{I_1,0}^{(N)} + y_{I_2,0}^{(N)}}{2} \quad (28)$$

When using a global, uniform averaging scheme, the locally less pertinent information will tend to "wash-out" the locally more pertinent information. However, some inferences can still be made from this initial uniform fusion. Namely, one would observe that such a fusion would still be more perceptually similar to the stimulus than to the uniform background. Thus, using the proposed weighting scheme, the stimulus would be given higher weight than the uniform background, in a way which was not directly related to measuring the amount of salient features in each of the source images. Therefore, this hypothetically demonstrates that the degree to which the initial estimate is perceptually similar to each source image could feasibly used to adaptively determine the sensor weights for the fusion procedure. A different initial estimate could have also been used. The effectiveness of such a weighting scheme is thus dependent on the establishment of a perceptually-driven similarity metric, such as the gradient structural similarity index (GSSIM). Accordingly, the fusion weights are defined by $$w_1(i, j) = \frac{|GSSIM_{y_{F,0}^{(N)}, y_{I_1,0}^{(N)}}(i, j)|^\alpha}{|GSSIM_{y_{F,0}^{(N)}, y_{I_1,0}^{(N)}}(i, j)|^\alpha + |GSSIM_{y_{F,0}^{(N)}, y_{I_2,0}^{(N)}}(i, j)|^\alpha} \quad (29)$$

$$w_2(i, j) = 1 - w_1(i, j)$$

where $\alpha$ is an empirical, user-defined parameter, which has been added to dictate how much stronger the locally more similar source image should be weighted. The weighted fusion is then given by $$y_{I_F,0}^{(N)}(i,j) = w_1(i,j) y_{I_1,0}^{(N)}(i,j) + w_2(i,j) y_{I_2,0}^{(N)}(i,j) \quad (30)$$

Practically, the $\alpha$ parameter dictates the degree to which the weights can feasibly deviate from those in the uniform averaging case, with this deviation derived from the local similarity between the initial fused image and each of the source images. If $\alpha=0$, then $w_1(i,j) = w_2(i,j) = 0.5$ at all pixel locations, and thus, the proposed method reverts to the uniform averaging case. For non-negative values of $\alpha$, the fusion weights are adaptively altered according to the local similarity assessment which has been described, with the degree of the alteration dictated by $\alpha$. This is to say that the adaptive weighting scheme can determine which sensor should have a greater weight, and the $\alpha$ parameter dictates exactly how much more of a greater weight it should have. The inclusion of this $\alpha$ parameter generalizes the approximation coefficient fusion rule between uniform weighting ($\alpha=0$), simple selection ($\alpha=\infty$), and values in between this range. In practice, it is sufficient to set α=1, as a formidable improvement in the fusion quality is already yielded in this case.

The inventive process also determines the contrast coefficients of the fused image $C_{I_F,LCM}^{(n)}$ at each scale n using an absolute contrast coefficient maximum rule $$C_{I_F,LCM}^{(n)}(i,j) = \begin{cases} C_{I_1,LCM}^{(n)}(i,j) & |C_{I_1,LCM}^{(n)}(i,j)| > |C_{I_2,LCM}^{(n)}(i,j)| \\ C_{I_2,LCM}^{(n)}(i,j) & |C_{I_1,LCM}^{(n)}(i,j)| \leq |C_{I_2,LCM}^{(n)}(i,j)| \end{cases} \quad (31)$$

The detail coefficients of the fused image at each scale are then computed by using the synthesis equations of the HVS-LP.

The performance of fusion processes deteriorate considerably when the input source images themselves are corrupted by noise. One solution for remedying this is to de-noise the images as a pre-processing step, or "denoise-then-fuse." Alternatively, another solution is to fuse the noisy images and de-noise this result, or "fuse-then-denoise." As described, these processes are referred to as separate-fusion-de-noising (SFD) processes, because the fusion and de-noising procedures are performed independently of each other. In contrast, in a joint-fusion-de-noising (JFD) architecture, fusion and de-noising are in a sense performed simultaneously. Specifically, the input images are again fused, but in contrast to the SFD approach, one image may also help to de-noise another more effectively.

Figure 12:
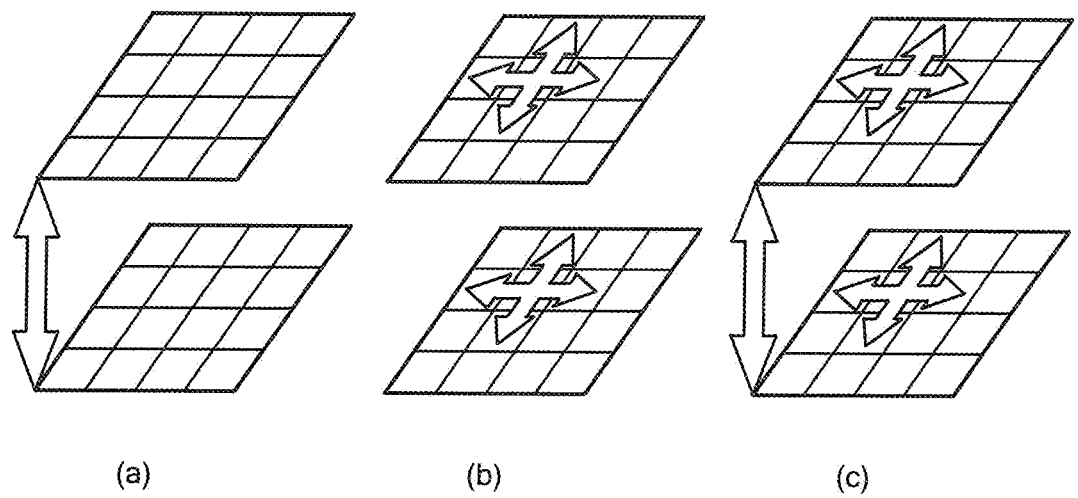
FIG. 12 is a graphical representation of (a) image fusion, (b) image de-noising, and (c) JFD visualized as averaging.

The extension of the NLM framework for joint de-noising and image fusion is motivated by FIGS. 12a-c, which show (a) image fusion, (b) image de-noising, and (c) JFD visualized as averaging along different axes. Visualizing the input images as matrices placed on a vertical stack, image fusion can be interpreted as an averaging procedure performed vertically, as in FIG. 12a, while image de-noising, horizontally, as in FIG. 12b. In fact, the de-noising operation can itself be viewed as a vertical averaging procedure, but of shifted and adaptively weighted versions of the image(s). Thus, the JFD procedure can be one in which both vertical and horizontal averaging are performed simultaneously.

Figure 13:
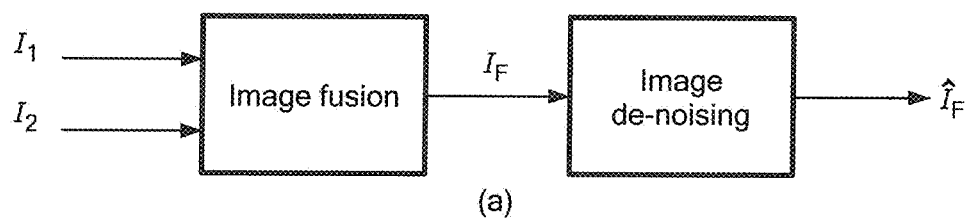
FIG. 13 is a diagram of (a) SFD processing and (b) JFD processing.
Figure 13:
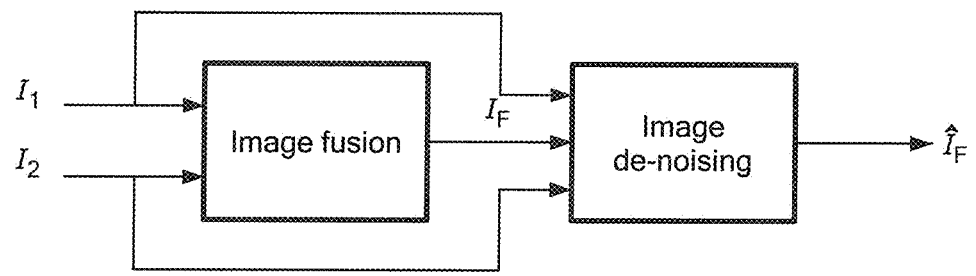
Figure 14:
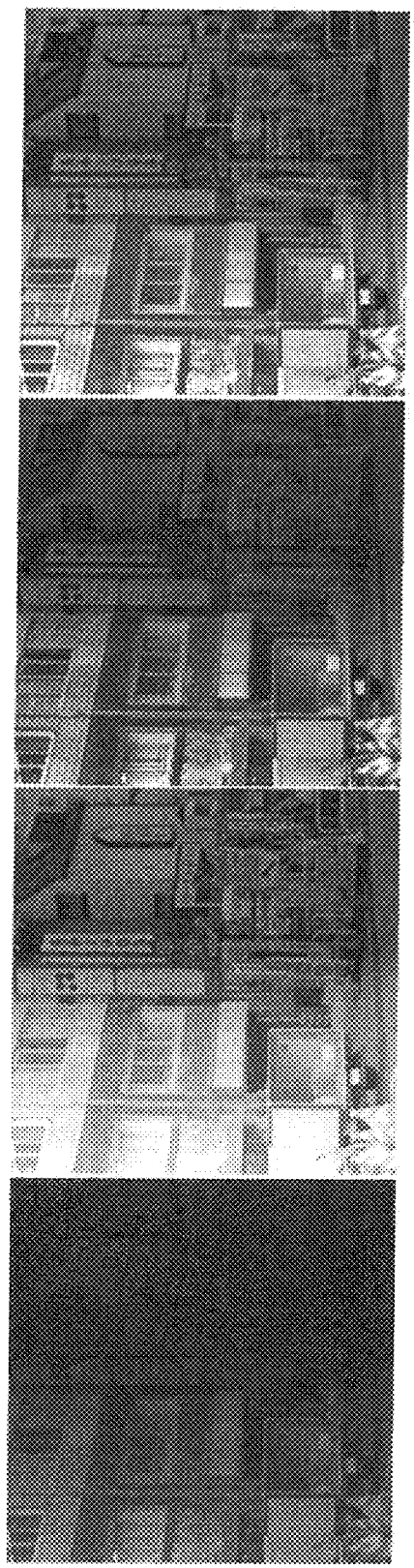
FIG. 14 shows (a) original image, (b) histogram equalization processed image, (c) contrast-limited adaptive histogram equalization, and (d) image after fusion of (b) and (c)

FIG. 13a shows a separate-fusion-de-noising (SFD) architecture and FIG. 13b shows a joint-fusion-de-noising (JFD) architecture. An inventive NLM-based JFD procedure is now formulated, which is easily applicable both to the NLM and HVS-NLM procedures. For ease of clarity, the procedure will be defined in the context of NLM. The extension to the HVS-NLM case is achieved by performing the JFD scheme at each level of decomposition, in a manner consistent to that which has been previously described.

The images $I_1$ and $I_2$ are fused in some way, yielding the noisy fusion result $I_F$. Here, they are fused using the proposed adaptive HVS-inspired approach. Three weights of the form $w_{k,l}^{q,r}$ are defined, where q is the reference image (in this case, the fused image $I_F$) and r is the template image. The weights are given by $$w_{k,l}^{F,F}(k',l') = \exp\left[\frac{\|I_F(\aleph_{k,l}) - I_F(\aleph_{k',l'})\|_{2,a}^2}{h^2}\right] \quad (32)$$

$$w_{k,l}^{F,1}(k',l') = \exp\left[\frac{\|I_F(\aleph_{k,l}) - I_1(\aleph_{k',l'})\|_{2,a}^2}{h^2}\right] \quad (33)$$

$$w_{k,l}^{F,2}(k',l') = \exp\left[\frac{\|I_F(\aleph_{k,l}) - I_2(\aleph_{k',l'})\|_{2,a}^2}{h^2}\right] \quad (34)$$

To determine if templates from $I_F$, $I_1$, or $I_2$ should be used to de-noise $I_F$, a hard decision rule is defined as $$\lambda_{k,l}^F(k',l') = \quad (35)$$
$$\begin{cases} 1 & w_{k,l}^{F,F}(k',l') \geq P \cdot w_{k,l}^{F,1}(k',l'), w_{k,l}^{F,F}(k',l') \geq P \cdot w_{k,l}^{F,2}(k',l') \\ 0 & \text{otherwise} \end{cases}$$

$$\lambda_{k,l}^1(k',l') = \quad (36)$$
$$\begin{cases} 1 & P \cdot w_{k,l}^{F,1}(k',l') \geq w_{k,l}^{F,F}(k',l'), w_{k,l}^{F,1}(k',l') \geq w_{k,l}^{F,2}(k',l') \\ 0 & \text{otherwise} \end{cases}$$

$$\lambda_{k,l}^2(k',l') = \quad (37)$$
$$\begin{cases} 1 & P \cdot w_{k,l}^{F,2}(k',l') \geq w_{k,l}^{F,F}(k',l'), w_{k,l}^{F,2}(k',l') \geq w_{k,l}^{F,1}(k',l') \\ 0 & \text{otherwise} \end{cases}$$

where P is a penalty parameter which for practical purposes can be set to 1. Accordingly, the fused and de-noised result is given by $$\hat{I}_F(k,l) = \quad (38)$$
$$\frac{\sum_{j \in W} \lambda_{k,l}^F(k',l') w_{k,l}^{F,F}(k',l') I_F(k,l) + \sum_{j \in W} \lambda_{k,l}^1(k',l') w_{k,l}^{F,1}(k',l') I_F(k,l) + \sum_{j \in W} \lambda_{k,l}^2(k',l') w_{k,l}^{F,2}(k',l') I_F(k,l)}{\sum_{j \in W} \lambda_{k,l}^F(k',l') w_{k,l}^{F,F}(k',l') + \sum_{j \in W} \lambda_{k,l}^1(k',l') w_{k,l}^{F,1}(k',l') + \sum_{j \in W} \lambda_{k,l}^2(k',l') w_{k,l}^{F,2}(k',l')}$$

If $I_1=I_2$, then $I_1=I_2=I_F$, the JFD process reverts to the de-noising procedure. If h=0, no de-noising is performed, the JFD process reverts to the fusion procedure. If P=0, then the process becomes a SFD procedure. In its most general sense, this process simultaneously performs image fusion and de-noising, as the source images $I_1$ and $I_2$ are used both to generate and de-noise the fused image.

It is understood that image fusion has been used extensively to fuse multiple source images obtained from multiple different sensors or capture techniques. However, there has been no systematic, generalized application of image fusion developed for the case in which only a single input image is available. This is generally expected to be the case for many image processing applications, such as image enhancement, edge detection and image denoising. Exemplary embodiments of the invention combine the outputs of existing image processing to yield the output of the system. Thus, by using image fusion concepts, certain embodiments of the present invention attempt to improve the quality of existing image processing by combining the respective advantages of each technique. Additionally, processes for image enhancement, denoising, and fusion are developed based on human visual system-inspired processing techniques. These inventive processes outperform standard image processing techniques because of their generalized multi-scale and perceptually-based formulations.

One issue in image enhancement is the different and often times contradictory criteria on which image enhancement algorithms have been formulated. Indirect image enhancement algorithms provide visually pleasing global enhancement, but can degrade the integrity of local edge features. Conversely, direct enhancements can provide adaptive edge enhancement, but generally do not provide satisfactory global enhancement. Thus, it is advantageous to combine the outputs of these two types of enhancements algorithms to leverage on the benefits of each. Moreover, given the characteristics of the direct and indirect image enhancements themselves, it is possible to more effectively combine their outputs. Using image fusion methodologies, exemplary embodiments of the present invention provide global enhancement while retaining the contrast information of the original image. Therefore, illustrative embodiments of the present invention are able to effectively decouple edge enhancement and global enhancement procedures so that they can be tuned separately. Doing so allows the global and edge enhancement procedures to be performed in series with reduced artifacting, and significantly improves the visual quality of enhancement results.

Image denoising has been a continuously studied problem in image processing due to the fundamental tradeoff between effective noise removal and accurate preservation of edges. In general, the greater the amount of smoothing which is applied to the noisy observation, the more the noise is suppressed and edge details and textures eliminated. Exemplary embodiments of the present invention combine the outputs of different denoising processes and/or parameter sets to yield the final denoised output. Specifically, an iterative fusion-based approach is used to fuse images smoothed to varying degrees to more accurately retain edges while also removing noise. Experimental results show that the proposed approach can improve image denoising results qualitatively and quantitatively using many secondary denoising processes.

Exemplary embodiments of the invention provide image fusion integrated to improve existing image processing. In general, the image enhancement processing described above can be classified as indirect or direct image enhancement based on the criteria for which enhancement is achieved. Known image processing techniques do not provide a means of using image fusion for image enhancement, image denoising, or any application, where only a single input source image is available. By employing PLIP model arithmetic operators can tune the image fusion process according to image-dependent characteristics. Standard mathematical operators may be viewed as an instance of the PLIP model arithmetic, and therefore, the image fusion adopting the PLIP model can be viewed as a generalization of existing image fusion using standard mathematical operators. The application of image fusion in this manner poses a means of combining the advantages of the numerous image enhancement methods that have been developed according to their various criteria. In one embodiment, the proposed system provides a means of combining image enhancement processes to improve both the local and global image contrast. Another embodiment decouples the global and adaptive enhancement procedures so that they can be tuned independently and be used in series.

It is understood that image enhancement processing described herein is desirable in a wide range of applications, such as object detection, object recognition, and other computer vision and computer-aided decision systems, security, medical, digital image retouching software packages, and the like.

Figure 15:
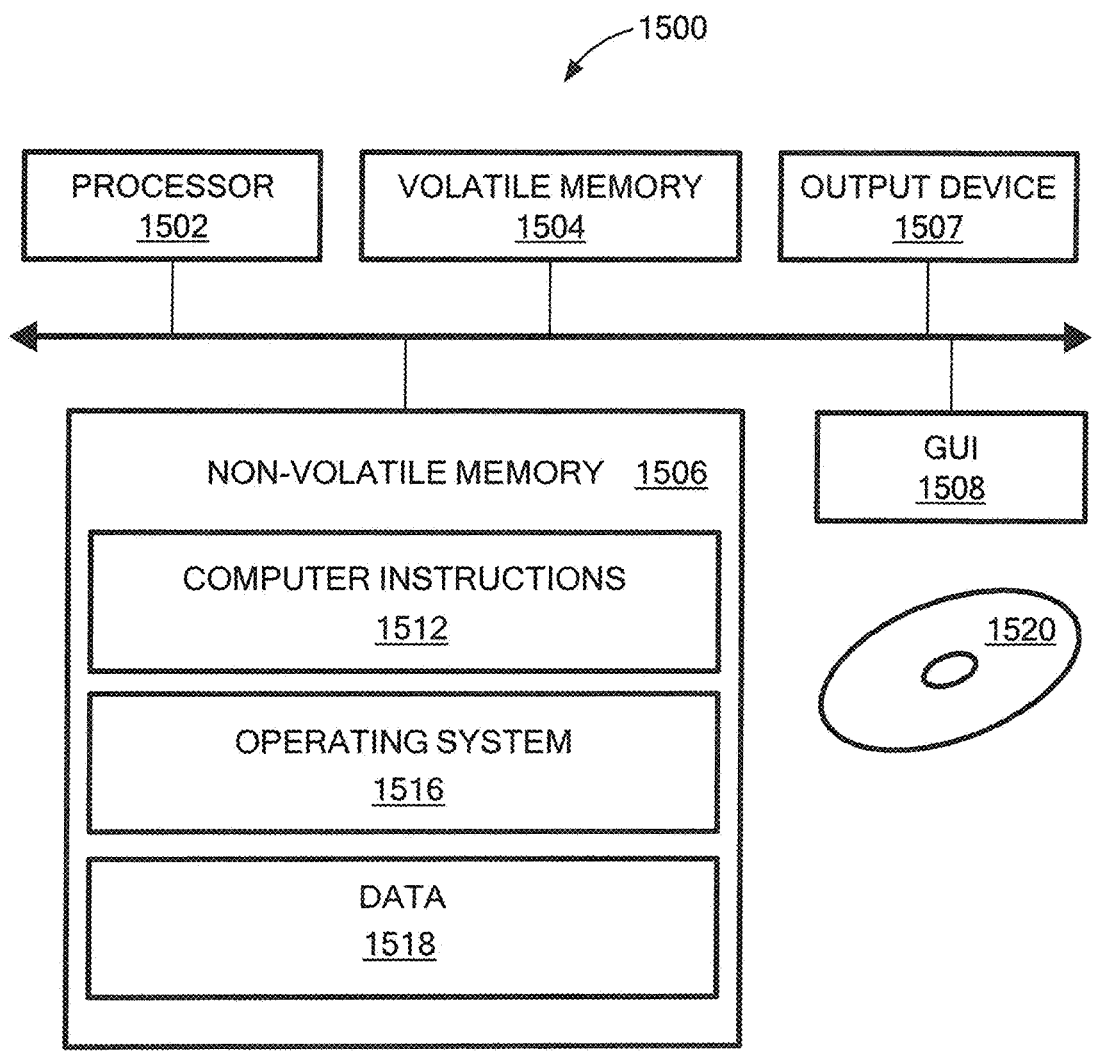
FIG. 15 is a representation of an exemplary computer that can perform at least a portion of the processing described herein.

FIG. 15 shows an exemplary computer 800 that can perform at least part of the processing described herein. The computer 1500 includes a processor 1502, a volatile memory 1504, a non-volatile memory 1506 (e.g., hard disk), an output device 1507 and a graphical user interface (GUI) 1508 (e.g., a mouse, a keyboard, a display, for example). The non-volatile memory 1506 stores computer instructions 1512, an operating system 1516 and data 1518. In one example, the computer instructions 1512 are executed by the processor 1502 out of volatile memory 1504. In one embodiment, an article 1520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method for performing image fusion for image processing, comprising:
receiving a first input image (I);
generating, using a computer processor, N secondary outputs ($I_n$, n=1, 2, ... N−1, N) using N combinations of secondary image processes and/or parameter sets derived from the first input image (I); and
fusing the intermediate outputs to yield a processed output (I') including decomposing the first input image into different grayscale representations, separately processing the different grayscale representation to provide outputs, and fusing the outputs to yield the processed output (I').

2. The method according to claim 1, wherein the first input image was captured by a single sensor.

3. The method according to claim 1, wherein the first input image data was captured via multiple sensors.

4. The method according to claim 1, further including fusing the intermediate outputs based on at least one parameter corresponding to one or more of image enhancement, image denoising, edge detection, object detection, object recognition, and/or computer aided-decision making.

5. The method according to claim 1, further including decomposing the first input image into different subimages and fusing the subimages by different processes.

* * * * *